United States Patent [19]
Ghanwani et al.

[11] Patent Number: 6,075,769
[45] Date of Patent: Jun. 13, 2000

[54] METHOD AND APPARATUS FOR NETWORK FLOW CONTROL

[75] Inventors: Anoop Ghanwani; Brad Alan Makrucki, both of Durham; Ken Van Vu, Cary, all of N.C.

[73] Assignee: Cisco Systems, Inc., San Jose, Calif.

[21] Appl. No.: 08/978,831

[22] Filed: Nov. 26, 1997

[51] Int. Cl.[7] .................................................. H04J 1/16
[52] U.S. Cl. ........................ 370/229; 370/235; 709/234
[58] Field of Search .................................. 370/229, 231, 370/235, 237, 230, 232; 709/234

[56] References Cited

U.S. PATENT DOCUMENTS

| | | | |
|---|---|---|---|
| 5,935,213 | 8/1999 | Rananand et al. | 709/234 |
| 5,959,973 | 9/1999 | Meurisse et al. | 370/232 |
| 5,991,266 | 11/1999 | Zheng | 370/229 |
| 6,011,777 | 1/2000 | Kunzinger | 370/232 |

*Primary Examiner*—Chi H. Pham
*Assistant Examiner*—Maikhanh Tran
*Attorney, Agent, or Firm*—Cesari and McKenna

[57] ABSTRACT

A data transfer flow control system for a packet communications system includes a plurality of nodes interconnected by transmission links. The rate at which a sender node transmits information to a destination node in a network is modified in accordance with congestion information returned to the sender node from nodes along the path of the transmission or from the information receiver. The rate change for information being sent from the sender node is modified based upon the amount of elapsed time occurring since the last rate change of the same type. In first and second examples, the rate change is implemented in accordance with exponential and linear relationships, respectively, between the modified flow rate and the elapsed time since the last rate change.

16 Claims, 2 Drawing Sheets

METHOD AND APPARATUS FOR NETWORK FLOW CONTROL

RELATED APPLICATIONS

The present application is related to co-pending application entitled "ATM NETWORK AVAILABLE BIT RATE (ABR) FLOW CONTROL SYSTEM", U.S. Ser. No. 08/978,178, filed on Nov. 25, 1997, and "METHOD AND APPARATUS FOR ALLOCATION OF AVAILABLE BANDWIDTH" U.S. Ser. No. 08/977,220, Filed on Nov. 24, 1997 both assigned to the assignee of the present application and included herein by reference.

FIELD OF THE INVENTION

The present invention relates generally to data communications networks and more particularly to a flow control system for regulating information transfer rate within networks.

BACKGROUND OF THE INVENTION

Efficient informational flow control has been an important consideration in the research and design of high speed communications networks. Flow control processing varies a sender's allowable rate of information transfer in response to feedback from the network within which the information is being transferred. In an exemplary embodiment, a traffic source sends a "probe" message into the network and receives a "reply" from the traffic destination end system. This information flow happens continuously (as long as data is available at the source) so the source receives information every "round-trip" time. If a network is not congested, the session's source of the information being transferred is allowed to increase the rate at which the information is sent thereby taking greater advantage of available bandwidth. When more congestion is present, the rate is reduced. Typically the sending rate of a session during which information is being transferred will oscillate around a desired operating point.

A session with a short propagation delay receives and reacts to feedback from the network much faster than a session with a long propagation delay. This can cause an unfair allocation of available bandwidth, i.e. closer nodes will be granted bandwidth at a disproportionate rate relative to nodes which are located a greater distance away. The sending rate for an information packet is decreased if one of the nodes along its path is congested. That "greater distance" information transfer is therefore at a disadvantage with respect to sessions traversing a single "hop", or relatively fewer "hops" between source and destination nodes Thus, in typical rate-based flow-controlled methodologies, connection "length" (for example the propagation delay across the network as measured by the endpoints) affects bandwidth allocation fairness. This is especially true of rate control schemes in which rate changes occur at times controlled by the round-trip time experienced during network operation. For example, in systems where rate increases are accomplished according to the sender receiving a congestion message from the receiver based on a control loop determined by the round trip time, connections which have smaller round-trip times have an advantage in that their rate increase epochs occur more frequently, and thus the closer nodes can obtain a larger allocation of the shared link bandwidth if they do not scale their increases according to a globally-set baseline increase amount and their experienced round-trip or update times.

Therefore there is a need for an improved methodology for determining and assigning allocations of available bandwidth for data transfers within networking systems.

SUMMARY OF THE INVENTION

A data transfer flow control system for a packet communications system includes a plurality of nodes interconnected by transmission links. The rate at which a sender node transmits information to a destination node in a network is modified in accordance with congestion information returned to the sender node from nodes along the path of the transmission. The rate change for information being sent from the sender node is modified based upon the amount of elapsed time occurring since the last rate change of the same type. In first and second examples, the rate change is implemented in accordance with exponential and linear relationships, respectively, between the modified flow rate and the elapsed time since the last rate change.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
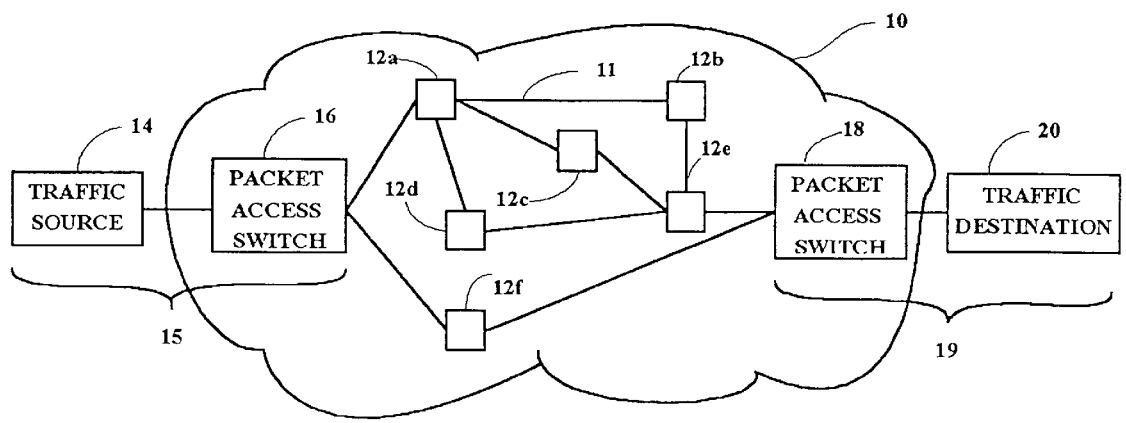
FIG. 1 is a schematic representation of a packet switching network within which the present invention may be used.

Mainframe 22 with a number of directly connected terminals, such as terminals 24a, 24b and 24c used to support input/output operations for a transaction processing application for example, such as credit verification. The node would also include a packet network access switch 26 connected both the remainder of the ATM network (not shown) and to the mainframe and possibly to a local area network 28 and one or more terminals, such as terminals 30a and 30b, used in a high bandwidth application for example, such as a videoconferencing application. In a given installation, additional controllers or network elements, such as a communication controller or a router, might be part of the system. For example, a router or a communication controller (neither of which is shown) might be interposed between the mainframe 22 and the ATM access switch 26. Similarly, the terminals 24 might be connected indirectly to mainframe 22 through a display controller (not shown). A packet network access switch can perform a number of functions in a typical system. The access switch may serve to aggregate or concentrate data provided by the various connected components.

Figure 3:
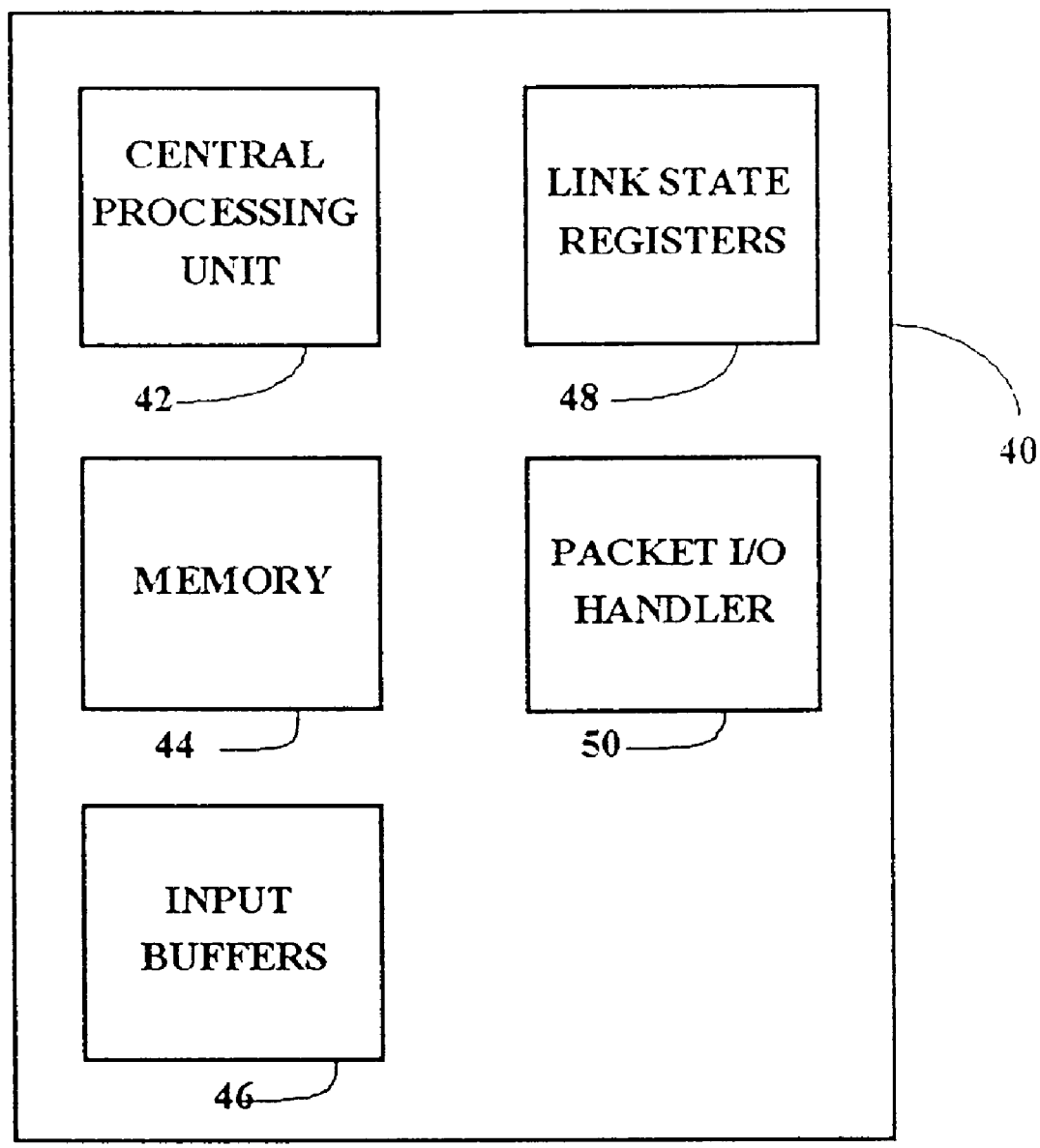
FIG. 3 is a high level view of components of a data processing/handling system which can be used to implement the present invention.

As shown in FIG. 3, a typical general purpose data processing control system 40 would include a central processing unit 42, control and data memory 44, input buffers 46 for temporarily storing packets/data received from other nodes in the network, link state registers 48 for storing information about the state of various links connected to the system and a packet I/O handler 50 for performing necessary input/out and switching functions. Different queues may be used for different classes of ATM traffic although each queue operates on a First-In First-Out basis.

As shown in FIG. 1, a packet switching system is commonly referred to as including a cloud 10, cloud being a term of art that collectively represents the various nodes (communication systems) and links (transmission media) that are within the system. For a particular data path set up between a traffic source 14 and a traffic destination 20, the nodes can be characterized as intermediate nodes, such as nodes 12a through 12f, or endpoint nodes. An endpoint node is either a source or destination system in combination with the hardware and software needed to access the remainder of the packet switching network. The combination of traffic source 14 and an packet network access switch 16 is an example of a source endpoint 15 while the combination of traffic destination 20 and packet network access switch 18 is an example of a destination endpoint 19.

The role (and characterization) of any particular node may change for different network connections. For example, for a different connection, endpoint 19 might either serve as a traffic source or as an intermediate node on a path between two other nodes.

The various nodes are shown as being interconnected by links, such as link 11. The representation of the links is not intended to imply that all of the links are the same. Each link may be any of several known types of media capable of supporting high speed digital traffic, including copper wire, optical fiber or even microwave or satellite wireless links.

Figure 2:
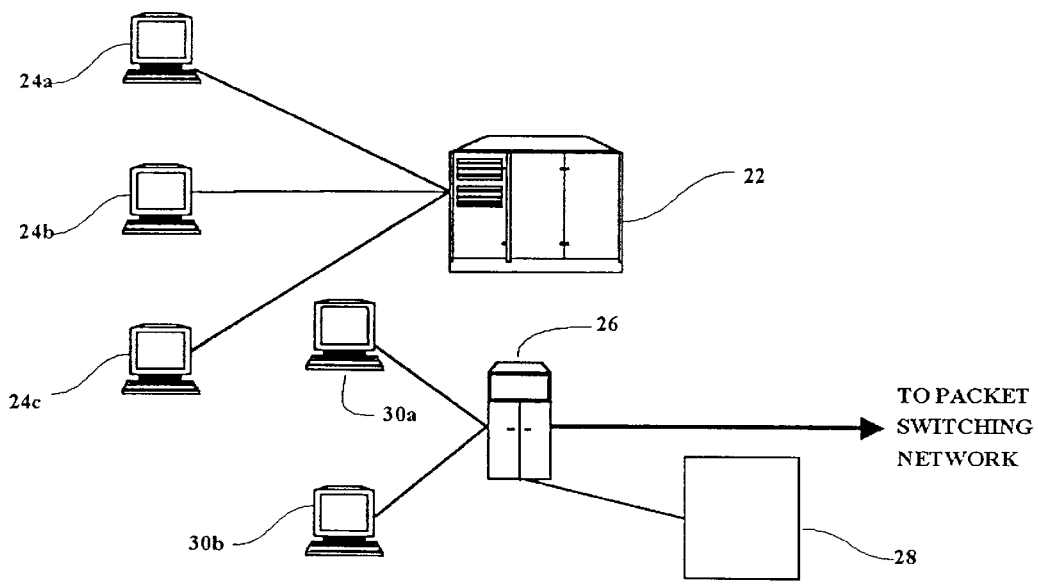
FIG. 2 is illustrative of the kinds of data processing and/or communication equipment which can exist at a node in a network.

FIG. 2 is a more detailed representation of the kind of data processing equipment that might be found at a typical node in a packet network system. The node could include a Traffic sources 14 and traffic destinations 20 (or any element implementing a rate control methodology) can deduce network conditions from timing information. For example, a traffic source might include timing information in the source's probe packets. The traffic destination can then combine that information with information measured at the destination point. From that combination, the traffic destination can then deduce the congestion level experienced by the probe packet. From that deduction, the traffic destination would form a control message to be sent to the traffic source. The control message, or "reply" message, would indicate, for example, that the source should increase or decrease its sending rate. Thus, the traffic source and traffic destination form a control loop based on the present round-trip time.

The source then adjusts the source rate based on the feedback congestion information contained in the reply message. In an exemplary networking system, a sender (or source endpoint implementing a rate-based flow control methodology) transmits data at a rate which changes over time and according to congestion messages received during the transmission. The system implements one of several ways by which the sender obtains the congestion information from the connection receiver or the network elements. When provided by the connection receiver, the congestion information may be deduced from network congestion indications, or from network delay changes (since they are affected by congestion within the network buffers). The sender obtains the congestion information at certain points in time which can occur at different frequencies depending on connection length and/or end station timer granularity. In the example, a sender sends a "probe" message into the network and receives a response indicative of network congestion conditions at the time. Thus the sender has only one outstanding "probe" message in the network at any one time.

The sender's probe message summons a response message which can be formulated by either the receiver endpoint or a network internal node. In either case, the sender receives a reply message and then changes the sender rate in reaction to the response message. The response message may contain various information, but the method described applies to the case when the response message contains "increase rate" or "decrease rate" information rather than containing a new and specified sending rate or value for implementation by the sender.

In response to the increase/decrease information, the sender calculates a new sending rate and transmits at the new rate until another response message is received according to the specific timing schedule used in the flow control methodology. Typically a rate adjustment will be done according to some pre-determined rate change function (linear, exponential, etc.). The method described herein applies to systems in which the increases and/or decreases are determined by a methodology based on discrete steps. The common methodology maps increase/decrease information received and sends messages at a new sending rate that is determined independently of the amount of time that occurred between the steps. The disclosed method involves additionally computing rate changes based on the time elapsed between rate changes rather that changing rates by a fixed amount whenever a reply message arrives.

In an example, a networking system can have the connection receiver node determine congestion conditions and send a reply message back to the sender node to signal the sender to adjust the sending rate. In that case, the time between rate adjustments will depend on the round trip time of the connection. Methodologies that adjust their rates based on a "static" increase curve will allow unfairness to occur since connections having short propagation delays or connection lengths, have an advantage in that they can increase their rates more frequently or at a higher frequency, thus obtaining a greater portion of the shared link bandwidth. According to the presently disclosed methodology, the size of the sender rate change is adjusted in relation to the time between rate changes. The adjustment may be in accordance with any of several selectable rate curve relationships including linear and exponential among others.

In every system, it is necessary to establish a "baseline" connection length that is used as a global reference for determining step sizes in rate changes. The baseline is given by the longest connection for which a fair allocation is important. Connections which are longer will receive a smaller allocation because their step sizes are the same as the baseline connection but their change frequency is lower. To assure accurate allocation of bandwidth for connections "shorter" than the baseline, the increments are scaled according to the actual time between changes. Using the longest connection length as the baseline is not necessary but establishing a baseline is necessary to provide a global value against which all scaling can be done so that fair allocation can be achieved.

In the example where an exponential rate curve is implemented, the sender increases its sending rate by an amount governed by an exponential curve when it receives "increase" information in a reply message. The amount of the increase in one example is related to a rate increase control parameter "$\lambda$" which is generally chosen to obtain acceptable performance, the asymptotic/goal rate "r(A)" for the sender, and an initial sensing rate "r(0)". If, for example, the increase curve is set to be identical in time for two connections having different lengths. Thus there will be a first time factor "t(L)" representing the time between rate increases for the "long" connection, and a second time factor "t(S)" representing the time between rate increases for the second and relatively shorter connection. The approach taken, though not required, is to set the rate increase parameter for the long connection and compute increase amounts for shorter connections from the setting chosen for the baseline long connection.

To implement an exponential rate increase function is equivalent to increasing a sender's rate (at the increase epochs) such that the next sender rate is related to the present sender rate plus an increase factor. The increase factor is related to the quantity of the asymptotic rate less the present rate, with that quantity divided by a control parameter "k". At the rate increase epochs (which occur at the reply message processing times), the rate is increased by a fraction of the distance (1/k) from the present sending rate to the asymptotic/goal rate where "k" is seen as the new control parameter. The control parameters are different but may be related. Then assuming, without loss of generality, that each sender starts their rate at rate r(0) at time t(0), and they are to have the same rate at the next time they change their rates at identical times. That future time (t') is given by the lowest common multiple of their update times. It can then be determined that the increase factor "k(s)" is necessary so that the short node and the far node to have the same rate increase functions would be equal to the quantity "1" (one) divided by a quantity equal to "1" minus a distance relativity factor. The distance relativity factor would equal "γ" to the power given by the ratio of the shorter receiver node distance "1(s)" divided by the longer receiver node distance "1(1)". The quantity "γ" in the example is equal to the quantity "k(1)−1" divided by the quantity "k(1)". This gives the calculation for the increase factor k(s) for the short connection. It is presumed that k(1) for the long connection has been chosen as the baseline increase control parameter for the network. A linear approximation can also be derived for the quantity k(s) in order to simplify the calculations done during the execution of the disclosed methodology.

The calculation for k(s) provides a means for adjusting the steps taken by connections as the delays vary. The sender in this example is taken to be one having a "short" connection length or "1(s)". The method would be implemented such that when a sender receives a reply message and determines that an increase beyond its previous rate should occur, 1(s) is determined by monitoring the time between rate changes and then computing k(s) based on the above methodology. The rate increase expression "r(next)=r(present)+[r (asymptotic)−r(present)]/k(s)" to determine its next rate. If the experienced time between rate increases is greater than 1(1), then k(s)=k(1) would be used.

In an exemplary linear increase application, a linear curve is used to govern the rate increases rather than a exponential curve, and the determination of k(s) differs accordingly. In a linear example, where "I" is the rate increase control parameter, and the initial rate is r(0), then r(t)=r(0)+(I*t). Expressing the increases at the rate increase epochs gives: "r(next)=r(present)+I". Equating the rates at the first common change time gives: "[I(1)]*[1(s)]=[I(s)]*[1(1)]". This gives the expression for the rate increase control parameter for short connections I(s) to be equal to the rate increase control parameter for long connections I(1) multiplied by the quotient of the short inter-node length 1(s) divided by the long inter-node length 1(1).

Using similar arguments on "decrease" message processing leads to similar results for decrease amounts as a function of connection "lengths". The calculations are identical in concept to those presented above.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and the methodology may even be included or integrated into a processor or CPU or other larger system integrated circuit or chip. The methodology may also be implemented partially or solely in program code which may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for adjusting a flow rate at which a sender node in a network sends information packets to destination nodes in the network, the method comprising:

sending a probe packet from the sender node among the information packets;

providing transmission congestion information within said probe packet in accordance with transmission congestion conditions within the network;

returning the probe packet to the sender node;

determining a type of change indicated by the transmission congestion information of the probe packet;

determining a measure of elapsed time since the last rate change of the type indicated; and modifying the sender flow rate based upon said elapsed time.

2. The method as set forth in claim 1 and further including:

establishing a baseline sender node to destination node connection length to provide a reference value for transmission path length; and using the baseline connection length in evaluating sender node rate changes.

3. The method as set forth in claim 1 wherein said type of change is an increase in the sender node flow rate.

4. The method as set forth in claim 1 wherein said type of change is a decrease in sender node flow rate.

5. The method as set forth in claim 1 wherein said modifying is accomplished in accordance with a predetermined relationship between the modified flow rate and said elapsed time.

6. The method as set forth in claim 5 wherein said predetermined relationship is a curvilinear relationship.

7. The method as set forth in claim 5 wherein said predetermined relationship is a exponential relationship.

8. The method as set forth in claim 5 wherein said predetermined relationship is a linear relationship.

9. The method as set forth in claim 2 wherein said modifying is accomplished in accordance with a predetermined relationship between the modified flow rate and said elapsed time.

10. The method as set forth in claim 9 wherein said redetermined relationship is a curvilinear relationship.

11. The method as set forth in claim 9 wherein said predetermined relationship is a exponential relationship.

12. The method as set forth in claim 9 wherein said predetermined relationship is a linear relationship.

13. A data communications system comprising:

a sender node arranged for sending data packets along a transmission path at a sender flow rate;

a destination node arranged for receiving said data packets, said sender node being selectively operable for sending probe packets among said data packets;

intermediate nodes between said sender node and said destination node, said intermediate nodes being selectively operable for modifying data content within said probe packet to indicate traffic congestion conditions along the transmission path, said sender node being arranged for receiving said probe packet after said probe packet has been modified, said sender node being further selectively operable for determining a type of change indicated by the modified data content of the probe packet, said sender node being further operable for determining a measure of elapsed time since the last rate change of the type indicated, and modifying the sender flow rate based upon said elapsed time.

14. A data communications system comprising:

a sender node arranged for sending data packets along a transmission path at a sender flow rate;

a destination node arranged for receiving said data packets, said sender node being selectively operable for sending probe packets among said data packets, said probe packets containing timing information related to said sending of said probe packets, said destination node being operable to determine congestion conditions within said system from said timing information contained in said probe packets.

15. The system as set forth in claim 14 wherein said destination node is further operable for providing a reply message in response to said timing information, said destination node being further operable for returning said reply message to said sender node.

16. The system as set forth in claim 15 wherein said sender node is arranged to receive said reply message from said destination node, said sender node being further operable for changing said sender flow rate in response to said response message.

* * * * *